(12) United States Patent
Negishi et al.

(10) Patent No.: US 12,252,754 B2
(45) Date of Patent: Mar. 18, 2025

(54) MOLTEN STEEL DENITRIFICATION METHOD AND STEEL PRODUCTION METHOD

(71) Applicant: JFE STEEL CORPORATION, Tokyo (JP)

(72) Inventors: Hidemitsu Negishi, Tokyo (JP); Rei Yamada, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/560,737

(22) PCT Filed: May 12, 2022

(86) PCT No.: PCT/JP2022/020009
§ 371 (c)(1),
(2) Date: Nov. 14, 2023

(87) PCT Pub. No.: WO2022/259806
PCT Pub. Date: Dec. 15, 2022

(65) Prior Publication Data
US 2024/0247329 A1    Jul. 25, 2024

(30) Foreign Application Priority Data
Jun. 11, 2021 (JP) .................................. 2021-098131

(51) Int. Cl.
*C21C 7/04* (2006.01)
*C21C 7/00* (2006.01)
(Continued)

(52) U.S. Cl.
CPC ............ *C21C 7/04* (2013.01); *C21C 2300/08* (2013.01)

(58) Field of Classification Search
None
See application file for complete search history.

(56) References Cited

U.S. PATENT DOCUMENTS

| 4,586,956 A | 5/1986 | Labate |
| 6,190,435 B1 | 2/2001 | Miyamoto et al. |

(Continued)

FOREIGN PATENT DOCUMENTS

| CN | 104073602 B | 1/2017 |
| CN | 108396094 A | 8/2018 |

(Continued)

OTHER PUBLICATIONS

Dec. 12, 2023 Office Action issued in Japanese Patent Application No. 2021-098131.

(Continued)

*Primary Examiner* — Jenny R Wu
(74) *Attorney, Agent, or Firm* — Oliff PLC

(57) ABSTRACT

A molten steel denitrification method, wherein an extremely low nitrogen concentration range is stably reached in a short time without use of a top-blown gas, is a denitrification process wherein CaO—and—$Al_2O_3$-containing slag formed by a combination of an Al addition step of adding a metal—Al-containing substance to molten steel to deoxidize and turn the molten steel into Al-containing molten steel and a CaO addition step of adding a CaO-containing substance to the molten steel is brought into contact with the Al-containing molten steel to remove nitrogen in the molten steel, in which the molten steel is stirred at a stirring power density ε of 60 W/t or higher. In the denitrification process, a surface of the molten steel or the slag is subjected to an atmosphere of $1.0 \times 10^5$ Pa or lower. In a steel production method, the obtained molten steel is cast after the components are adjusted.

5 Claims, 4 Drawing Sheets

(51) Int. Cl.
*C21C 7/072* (2006.01)
*C21C 7/10* (2006.01)
*C22C 33/04* (2006.01)

(56) References Cited

U.S. PATENT DOCUMENTS

| | | |
|---|---|---|
| 8,277,537 B2 | 10/2012 | Park et al. |
| 2009/0019968 A1 | 1/2009 | Tada et al. |
| 2010/0071509 A1 | 3/2010 | Numata et al. |
| 2012/0180601 A1 | 7/2012 | Panda et al. |
| 2013/0084205 A1 | 4/2013 | Numata et al. |

FOREIGN PATENT DOCUMENTS

| | | | |
|---|---|---|---|
| CN | 112442575 | A | 3/2021 |
| CN | 112813228 | A | 5/2021 |
| EP | 3633051 | A1 | 4/2020 |
| EP | 4353845 | A1 | 4/2024 |
| JP | S61-272313 | A | 12/1986 |
| JP | S62-164816 | A | 7/1987 |
| JP | S64-42516 | A | 2/1989 |
| JP | H05-320733 | A | 12/1993 |
| JP | H06-212244 | A | 8/1994 |
| JP | H07-224315 | A | 8/1995 |
| JP | H08-246024 | A | 9/1996 |
| JP | H09-087730 | A | 3/1997 |
| JP | H09-165615 | A | 6/1997 |
| JP | H11-279631 | A | 10/1999 |
| JP | 2000-129335 | A | 5/2000 |
| JP | 2000345234 | A * | 12/2000 |
| JP | 2002-339014 | A | 11/2002 |
| JP | 2005-232536 | A | 9/2005 |
| JP | 2007-197825 | A | 8/2007 |
| JP | 2007-211298 | A | 8/2007 |
| JP | 2008-240126 | A | 10/2008 |
| JP | 2014-148737 | A | 8/2014 |
| JP | 2015-086460 | A | 5/2015 |
| JP | 2020-180341 | A | 11/2020 |
| JP | 2021-059759 | A | 4/2021 |
| KR | 10-0207859 | | 7/1999 |
| KR | 2001-0062898 | A | 7/2001 |
| KR | 2012-0072822 | A | 7/2012 |
| KR | 10-2019-0142355 | A | 12/2019 |
| RU | 2002816 | C1 | 11/1993 |
| RU | 2171296 | C1 | 7/2001 |
| RU | 2378391 | C1 | 1/2010 |
| RU | 2433189 | C2 | 11/2011 |
| RU | 2608865 | C2 | 1/2017 |
| RU | 2740949 | C1 | 1/2021 |
| SU | 541871 | A1 | 1/1977 |
| SU | 1002370 | A1 | 3/1983 |
| SU | 1090724 | A1 | 5/1984 |
| SU | 1402621 | A1 | 6/1988 |
| TW | 201943856 | A | 11/2019 |
| WO | 2007/091700 | A1 | 8/2007 |
| WO | 2022/259808 | A1 | 12/2022 |

OTHER PUBLICATIONS

May 27, 2024 Office Action issued in Russian Application No. 2023132617 with English Translation of Search Report.
Aug. 29, 2023 Office Action issued in Japanese Patent Application No. 2021-098131.
Jul. 19, 2022 Search Report issued in International Patent Application No. PCT/JP2022/020009.
Mar. 26, 2024 Decision to Grant issued in Japanese Application No. 2021-098131.
Jul. 18, 2024 Extended European Search Report issued in European Application No. 22819990.7.
Aug. 9, 2022 International Search Report issued in International Patent Application No. PCT/JP2022/020010.
Dec. 13, 2022 Office Action issued in Japanese Patent Application No. 2021-098139.
May 9, 2023 Office Action issued in Taiwanese Patent Application No. 111120538.
Jun. 25, 2024 Office Action issued in Russian Patent Application No. 2024100344.
Jul. 18, 2024 Search Report issued in European Patent Application No. 22819991.5.
Ueno et al.; " Dynamic Behavior of Cavity Formed by a Top-blown Jet on Liquid Surface: Water Model Experiment ;" Tetsu-to-Hagne (Iron and Steel); 2015; pp. 74-81; vol. 101, No. 2.
Jul. 26, 2022 Search Report issued in International Patent Application No. PCT/JP2022/020007.
Jun. 6, 2023 Office Action issued in Taiwanese Patent Application No. 111120535.
Sep. 26, 2023 Office Action issued in Japanese Patent Application No. 2021-098118.
Dec. 19, 2023 Decision to Grant issued in Japanese Patent Application No. 2021-098118.
Jul. 16, 2024 Office Action Issued in U.S. Appl. No. 18/567,848.
May 27, 2024 Office Action issued in Russian Patent Application No. 2024100248.
The Polytechnic Dictionary; Editor-in-Chief A.YU. Ishlinskiy; Moscow; Soviet Encyclopedia; 1989; p. 102, col. 2.
Sep. 9, 2024 Extended Search Report issued in European Patent Application No. 22819989.9.
May 26, 2023 Office Action issued in Taiwanese Patent Application No. 111120537.
Aug. 9, 2022 International Search Report issued in International Patent Application No. PCT/JP2022/020017.
May 29, 2024 Office Action issued in Russian Patent Application No. 2023134445.
Stepanov, A.L., "Denitrification," Great Russian Encyclopedia, 2004, [URL: https://old.bigenc.ru/biology/text/1947933].
Aug. 6, 2024 Extended European Search Report issued in European Patent Application No. 22819992.3.
U.S. Appl. No. 18/565,348, filed Nov. 29, 2023 in the name of Negishi et al.
U.S. Appl. No. 18/289,968, filed Nov. 8, 2023 in the name of Tada et al.
U.S. Appl. No. 18/567,848, filed Dec. 7, 2023 in the name of Negishi et al.
Nov. 14, 2024 Office Action issued in U.S. Appl. No. 18/567,848.
Nov. 20, 2024 Office Action issued in Canadian Patent Application No. 3,218,995.
Nov. 21, 2024 Office Action issued in Canadian Patent Application No. 3,218,992.
Nov. 28, 2024 Office Action issued in Canadian Patent Application No. 3,219,692.

* cited by examiner

MOLTEN STEEL DENITRIFICATION METHOD AND STEEL PRODUCTION METHOD

TECHNICAL FIELD

The present invention relates to a method of removing nitrogen in molten steel charged in a reaction vessel, such as a ladle, by bringing the molten steel into contact with slag that is added and formed on top of the molten steel, and to a production method of steel produced by this method.

BACKGROUND ART

Nitrogen is a harmful component for metal materials. In a conventional steel production process, nitrogen [N] in molten iron is removed mainly by having it adsorbed onto the surfaces of air bubbles of carbon monoxide that is generated during a decarburization process of molten pig iron. Therefore, when it comes to molten steel with a low carbon concentration, due to the limited amount of carbon monoxide to be generated, a similar technique cannot remove nitrogen to a low concentration.

Meanwhile, to reduce $CO_2$ emissions, the steel production process needs to shift from a conventional method using a blast furnace or a converter to a method including melting scrap or reduced iron. In that case, molten iron obtained has a low carbon concentration, which may make it impossible to produce low-nitrogen steel for the above-described reason.

In this context, some methods of removing nitrogen from molten steel using slag have been proposed. For example, Patent Literature 1 shows a method in which an Al concentration in molten steel is held at a concentration of 0.7 mass % or higher in a VOD furnace for at least five minutes to form aluminum nitride (hereinafter "AlN") and thereby remove nitrogen.

Patent Literature 2 shows a method in which molten steel is produced in an electric furnace using iron scrap as a main iron source, and after the molten steel is discharged into another refining vessel and held therein, denitrification flux including an Al-containing substance is added to make AlN transition to slag, and then an oxygen-containing gas is blown onto the molten steel to remove nitrogen.

Patent Literature 3 shows a method in which molten metal is charged into a refining vessel having a gas top-blowing function, and after the surface of this molten metal is covered with slag composed mainly of CaO and $Al_2O_3$, an oxidizing gas is blown onto the surface of this covering slag to such an extent that this gas does not directly contact the molten metal to thereby remove nitrogen.

CITATION LIST

Patent Literature

Patent Literature 1: JP-A-H05-320733
Patent Literature 2: JP-A-2007-211298
Patent Literature 3: JP-A-H08-246024

SUMMARY OF INVENTION

Technical Problem

However, these conventional technologies have the following problems.

The technologies described in Patent Literatures 1 and 2, which use the formation of AlN for denitrification, have a problem in that part of the AlN formed remains in the molten steel and constitutes a starting point of cracking during casting in a later step.

Moreover, producing low-nitrogen steel with a nitrogen content in the order of a few tens of mass ppm by a denitrification method using the formation of AlN requires an Al concentration of at least about a few mass % to 10 mass %, with the solubility product of Al and N taken into account. Alternatively, effectively utilizing the denitrification reaction requires an initial nitrogen concentration in the order of a few hundred mass ppm. The problem is that the technologies described in Patent Literatures 1 and 2 are extremely costly for producing low-nitrogen steel in terms of process and therefore applicable only to those types of steel that have large amounts of dissolved nitrogen, such as stainless steel.

As conditions for shielding the molten steel from the oxidizing gas, the technology described in Patent Literature 3 presents the following:
(1) securing at least 15 kg of slag per ton of molten steel,
(2) controlling the amount of slag, the amount of bottom-blown gas, the composition and the flow rate of the top-blown gas, the height of the lance, the atmospheric pressure, etc. within appropriate ranges.

As for condition (1), the amount of slag increases according to the size of the vessel into which molten steel is charged. As for condition (2), specific control means and control ranges are not described, and a method for checking whether the molten steel is shielded from the gas is not clear. Thus, compatible conditions are ambiguous. The present inventors have confirmed that when a test is conducted using the same ranges as those in the compatible example described in Patent Literature 3, the denitrification speed becomes actually slow as the movement of nitrogen between the slag and the metal is restricted as a result of an increase in apparent oxygen partial pressure in the slag-metal interface due to the oxidizing gas, which makes this technology not practical for operation.

The present invention has been contrived in view of these circumstances, and an object thereof is to propose such a molten steel denitrification method that, in performing denitrification refining of molten steel using slag, an extremely low nitrogen concentration range can be stably reached in a short time without use of a top-blown gas. The present invention further proposes a steel production method that uses molten steel produced by this molten steel denitrification method.

Solution to Problem

As a result of vigorously conducting studies in view of the above-described problems, the present inventors have found that a rate-limiting step for the reaction in the denitrification process of removing nitrogen in molten steel by shifting it into a gas phase through slag as proposed in the prior patent literatures is mass transfer of nitrogen on the slag side and the metal side. That is, of the reactions of Formula (1) and Formula (2) below that are denitrification reactions of molten steel using the three phases of metal, slag, and gas, the reaction of Formula (2) progresses even when the oxygen partial pressure in the gas-slag interface is sufficiently low, and therefore, it is important to give the slag and the metal a sufficient stir and to have a high rate of melting of the slag (hereinafter referred to as a "slag formation rate"). In the reaction formulae below, [M] represents a state of element M being dissolved and contained in molten steel, and (R) represents a form of element R in slag or a state of a chemical substance R being dissolved and contained in slag. Hereinafter, the same will be used as a way of expression in this Description.

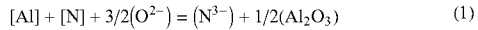
$$[Al] + [N] + 3/2(O^{2-}) = (N^{3-}) + 1/2(Al_2O_3) \quad (1)$$

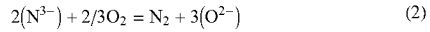
$$2(N^{3-}) + 2/3O_2 = N_2 + 3(O^{2-}) \quad (2)$$

A molten steel denitrification method according to the present invention that advantageously solves the above-described problems is a denitrification process in which CaO—and—$Al_2O_3$-containing slag formed by a combination of an Al addition step of adding a metal-Al-containing substance to molten steel to deoxidize and turn the molten steel into Al-containing molten steel and a CaO addition step of adding a CaO-containing substance to the molten steel is brought into contact with the Al-containing molten steel to remove nitrogen in the molten steel, characterized in that the molten steel is stirred at a stirring power density $\varepsilon$ of 60 W/t or higher.

The following characteristics would make the molten steel denitrification method according to the present invention a more preferable solution:
(a) in the denitrification process, a surface of the molten steel or the slag is subjected to an atmosphere of $1.0 \times 10^5$ Pa or lower;
(b) in the denitrification process, an MgO concentration (MgO) in the slag is set to 5.0 mass % or lower;
(c) in the denitrification process, a temperature $T_f$ of the molten steel being processed is increased by 5° C. or more at each time when an MgO concentration (MgO) in the slag increases by 1.0 mass % beyond 5.0 mass %; and
(d) in the Al addition step, an Al concentration [Al] (mass %) in the molten steel is set to be equal to or higher than a value [Al]e calculated by Formula (A) based on the stirring power density $\varepsilon$(W/t) during the denitrification process, $$[Al]_e = -0.072 \times \ln(\varepsilon) + 0.5822. \quad (A)$$

A steel production method according to the present invention that advantageously solves the above-described problems is characterized in that molten steel produced by any one of the above-described molten steel denitrification methods is cast after components are arbitrarily adjusted.

Advantageous Effects of Invention

According to the present invention, in performing denitrification refining of molten steel using slag, nitrogen can be stably removed to an extremely low nitrogen concentration range in a short time without use of a top-blown gas.

DESCRIPTION OF EMBODIMENTS

Embodiments of the present invention will be specifically described below. The drawings are schematic and may differ from the reality. The following embodiments illustrate a device and a method for embodying the technical idea of the present invention and are not intended to restrict the configuration to the one described below. Thus, various changes can be made to the technical idea of the present invention within the technical scope described in the claims.

Figure 1:
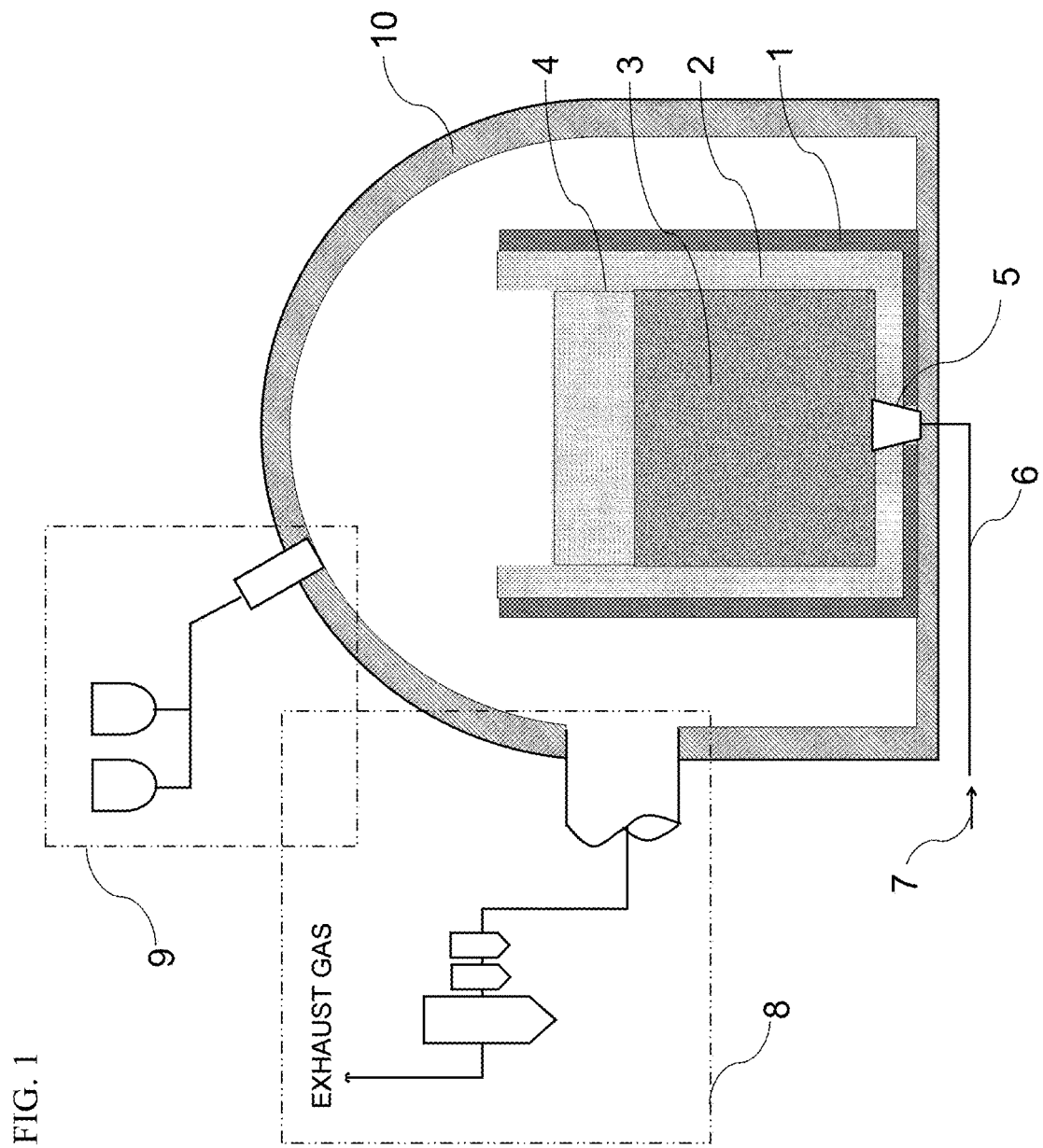
FIG. 1 is a schematic view showing one example of a device suitable for a molten steel denitrification method according to one embodiment of the present invention.

FIG. 1 shows a device configuration suitable to implement the present invention. Molten steel 3 is charged into a vessel 1, such as a ladle, that is lined with a refractory 2, and slag 4 containing CaO and $Al_2O_3$ is formed on top of this molten steel 3. In a state where surfaces of the molten steel 3 and the slag 4 are subjected to a depressurized atmosphere inside a vacuum vessel 10 having an exhaust system 8 and an alloy addition system 9, a stirring inert gas 7 is blown in through a bottom-blowing nozzle 5 connected to a gas pipe 6 to give a stir. As the stirring inert gas 7, for example, an Ar gas not including a nitrogen gas is preferable.

A step of adding a metal-Al-containing substance to the molten steel 3 to deoxidize the molten steel 3 and turn it into Al-containing molten steel (Al addition step) and a step of adding a CaO-containing substance to the molten steel 3 (CaO addition step) may be performed using the alloy addition system 9 or may be performed in a step before entering the vacuum vessel 10. The step of deoxidizing the molten steel 3 (deoxidization step) may be performed separately from the Al addition step. The CaO addition step can be performed at an arbitrary timing. Performing the CaO addition step after the deoxidization step is preferable, because then the temperature rise of the molten steel due to the deoxidation reaction can be used for formation of slag. Performing the CaO addition step after the Al addition step is further preferable, because this can reduce deoxidization failure or variations in the slag composition due to the added Al-containing substance being hindered by the thick slag from reaching the molten steel.

To form the CaO-and-$Al_2O_3$-containing slag 4, $Al_2O_3$ resulting from adding the CaO-containing substance and deoxidizing the molten steel is used. As the CaO-containing substance, for example, calcium aluminate that is a pre-melted or pre-mixed product may be used. As for the slag composition, a higher slag formation rate is more advantageous for the denitrification reaction, and a mass ratio C/A between CaO and $Al_2O_3$ is preferably within a range of 0.4 to 1.8 and more preferably within a range of 0.7 to 1.7.

The form of supplying the stirring inert gas 7 into the molten steel may be, other than the above-described method, for example, a form of injecting into the molten steel through an injection lance for blowing in an inert gas.

Next, preferred embodiments of the present invention will be described in detail along with how they were developed.

First Embodiment

Figure 2:
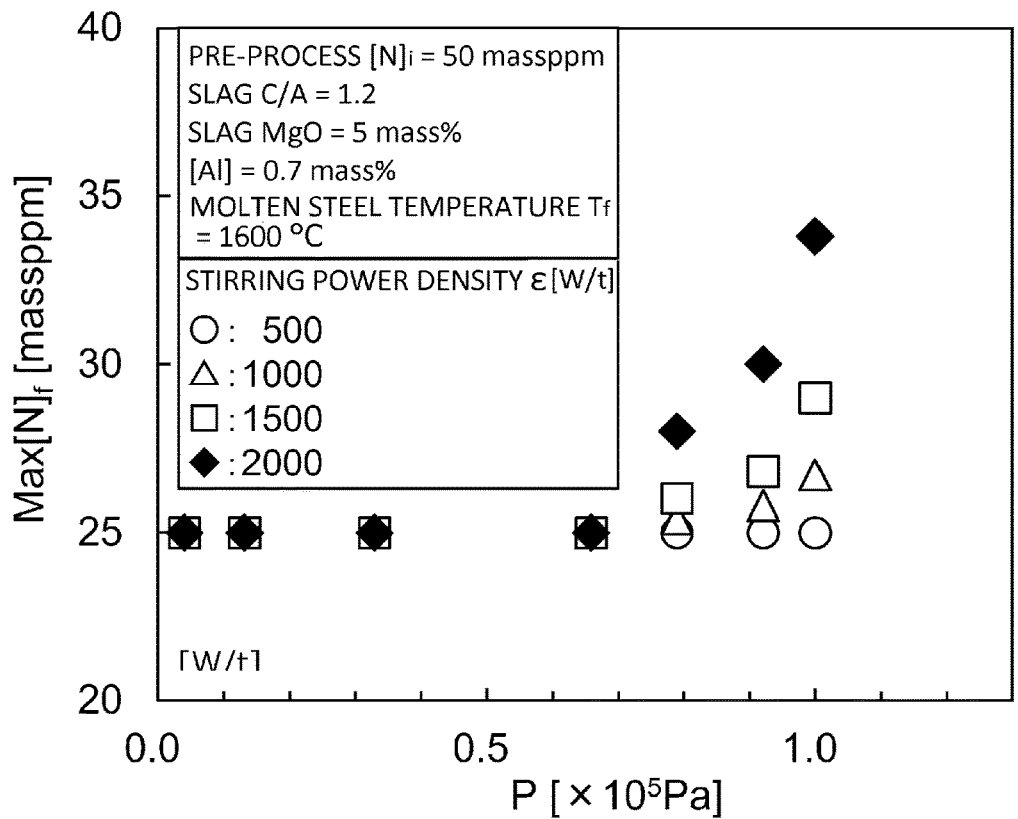
FIG. 2 is a graph showing an influence of a molten steel stirring power density $\varepsilon$ on a relationship between a furnace internal pressure P and an upper limit Max[N]$_f$ of variations in an achieved nitrogen concentration.

A first embodiment was found in the course of exploring a method for stably removing nitrogen to a low nitrogen concentration in a facility not having a gas top-blowing device. In a small-sized high-frequency vacuum induction melting furnace satisfying the configuration requirements of FIG. 1, the CaO—and—$Al_2O_3$-containing slag 4 including MgO at a concentration of 0 to 17 mass % was formed at a ratio of 15 kg/t or higher relative to 15 kg of the molten steel 3, in such an amount that the surface of the molten steel was not recognizable to the naked eye. After the atmospheric pressure inside the furnace was adjusted, a molten steel denitrification process was performed while the molten steel was given a stir at a stirring power density of 200 W/t to 2000 W/t. First, in a denitrification test in which the degree of vacuum in the furnace atmosphere (atmospheric pressure) P(Pa) was varied, as shown in FIG. 2, an upper limit value Max$[N]_f$ (mass ppm) of variations in the post-process nitrogen concentration changed according to the stirring power density $\varepsilon$ (W/t). In this case, an initial nitrogen concentration $[N]_i$ in the molten steel was 50 mass ppm; the Al concentration [Al] was 0.7 mass %; the slag composition had a mass ratio C/A between CaO and $Al_2O_3$ of 1.2; the MgO concentration (MgO) in the slag was 5 mass %; the molten steel temperature $T_f$ was 1600° C.; and the processing time t was 30 minutes. At a low stirring power density ($\varepsilon$ up to 500 W/t), the upper limit value Max$[N]_f$ of variations in the achieved nitrogen concentration remained stable up to an atmospheric pressure P of $1.0 \times 10^5$ Pa. In the case of the facility configuration of FIG. 1, the atmospheric pressure P becomes higher than outside air by a few percent due to the influence of a temperature rise inside the enclosed space and the bottom-blown gas. By contrast, at a high stirring power density ($\varepsilon > 500$ W/t), the upper limit value Max$[N]_f$ of variations in the achieved nitrogen concentration started to increase when the atmospheric pressure P exceeded $0.7 \times 10^5$ Pa, and the upper limit value Max$[N]_f$ of variations in the post-process achieved nitrogen concentration was found to become larger as the stirring power density $\varepsilon$ became higher. In this embodiment, therefore, a preferable atmospheric pressure P is specified as $1.0 \times 10^5$ Pa or lower, and it is further preferably $0.7 \times 10^5$ Pa or lower. A possible explanation is that, as the molten steel bath is stirred by the bottom-blown gas, the surface of the molten steel bulges and part of the surface becomes exposed, and through that part nitrogen is absorbed into the molten steel.

Figure 3:
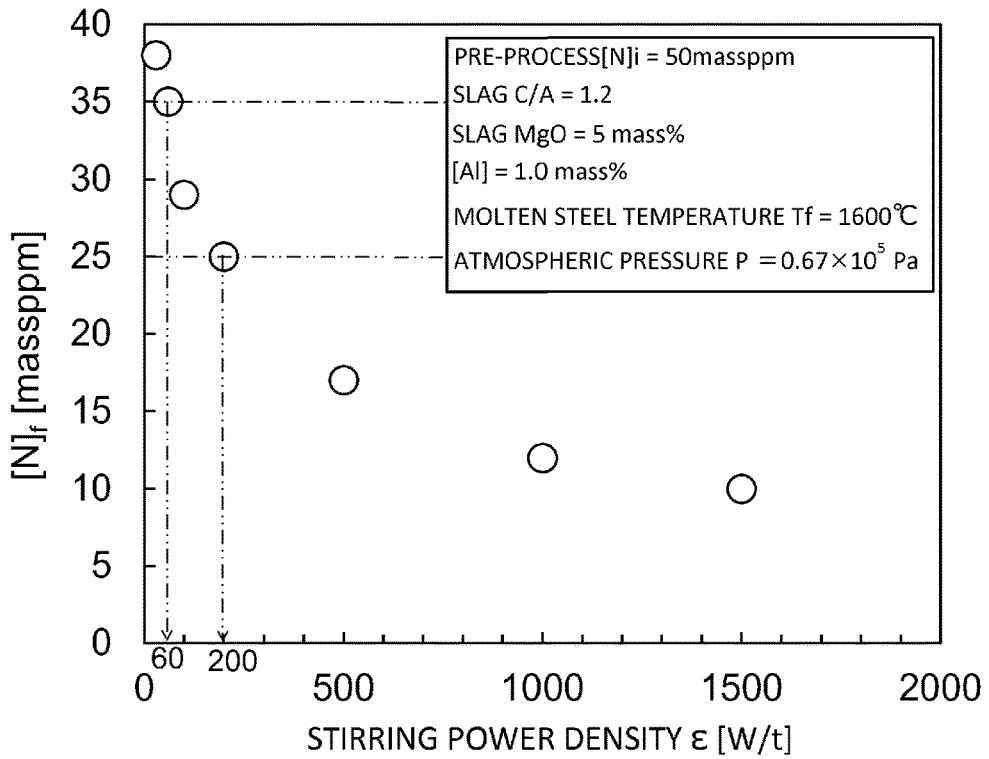
FIG. 3 is a graph showing a relationship between the stirring power density $\varepsilon$ and an achieved nitrogen concentration [N]$_f$.

Next, a denitrification test was conducted in which the stirring power density $\varepsilon$ was varied from 20 to 1500 W/t while the MgO concentration (MgO) was held constant at 5%, with the furnace atmospheric pressure P being $0.7 \times 10^5$ Pa, the Al concentration [Al] being 1.0 mass %, and the initial nitrogen concentration $[N]_i$, the C/A in the slag composition, the molten steel temperature $T_f$, and the processing time t being the same as those mentioned above. As a result, as shown in FIG. 3, with the stirring power density $\varepsilon$ at a level of 60 W/t or higher, a low nitrogen concentration range (where the nitrogen concentration $[N]_f$ is 35 mass ppm or lower) could be reached. An extremely low nitrogen concentration range (where the nitrogen concentration $[N]_f$ is 25 mass ppm or lower) was achieved with the stirring power density $\varepsilon$ at a level of 200 W/t or higher. The result of the study as just described led to the development of the first embodiment, i.e., a molten steel denitrification method that is a denitrification process in which CaO-and-$Al_2O_3$-containing slag formed by a combination of an Al addition step of adding a metal-Al-containing substance to molten steel to deoxidize and turn the molten steel into Al-containing molten steel and a CaO addition step of adding a CaO-containing substance to the molten steel is brought into contact with the Al-containing molten steel to remove nitrogen in the molten steel, in which the molten steel is stirred at a stirring power density $\varepsilon$ of 60 W/t or higher, or a molten steel denitrification method in which, further, in the denitrification process, the surface of the molten steel or the slag is subjected to an atmosphere of $1.0 \times 10^5$ Pa or lower. While the upper limit of the stirring power density $\varepsilon$ is not particularly limited, the bottom-blown gas, when blown in in a large amount, will be blown through without being effectively used; therefore, with about 5000 W/t as the upper limit, the stirring power density $\varepsilon$ should be appropriately set within such a range that possible troubles accompanying its rise (e.g., sculls adhering to a furnace lid) do not occur. In addition, since excessive depressurization causes an increase in facility costs of the exhaust system etc., the lower limit of the furnace atmospheric pressure P is preferably about $10^3$ Pa.

Second Embodiment

Figure 4:
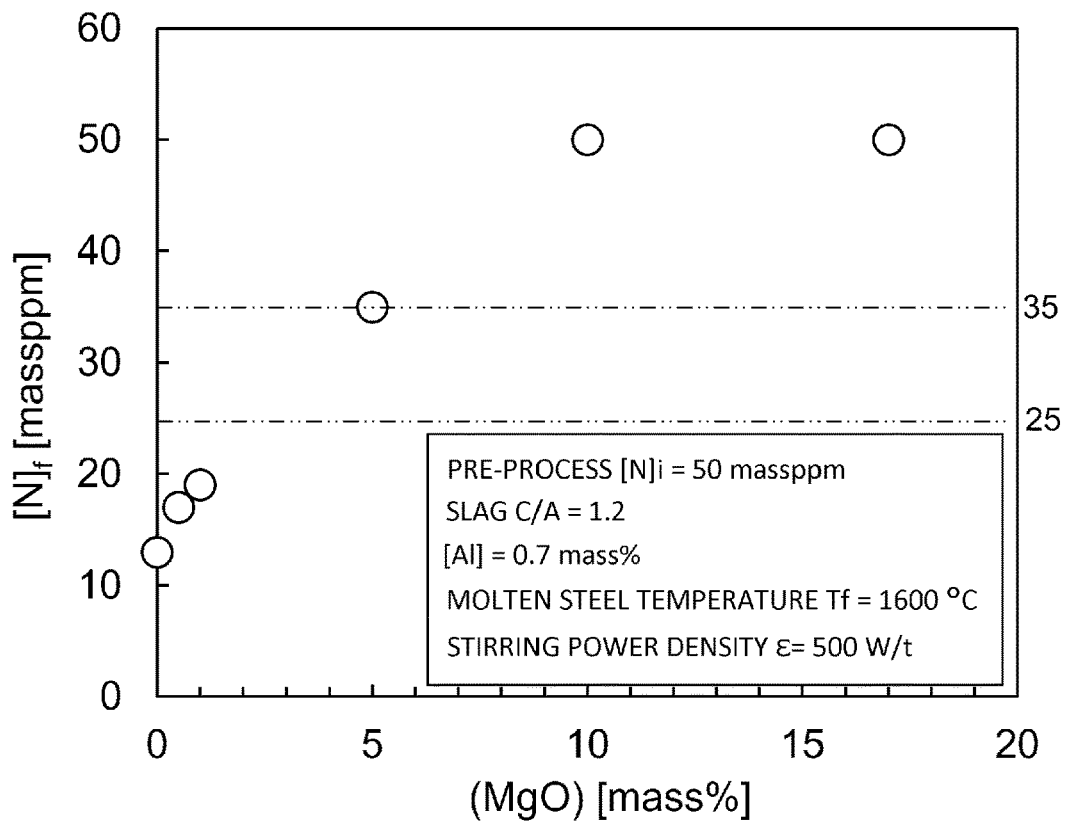
FIG. 4 is a graph showing an influence of an MgO concentration (MgO) in slag on the achieved nitrogen concentration [N]$_f$.

A second embodiment was found in the course of studying the influence of the MgO concentration (MgO) in the CaO—and—$Al_2O_3$-containing slag. A denitrification test was conducted in which the MgO concentration (MgO) in the slag was varied from 0 to 17 mass % while the stirring power density $\varepsilon$ was held constant at 500 W/t, with the furnace atmospheric pressure P being $0.7 \times 10^5$ Pa and the initial nitrogen concentration $[N]_i$, the Al concentration [Al], the C/A in the slag composition, the molten steel temperature $T_f$, and the processing time t being the same as those mentioned above. As a result, as shown in FIG. 4, when the MgO concentration (MgO) in the slag was at a level of 5 mass % or lower, a low nitrogen concentration range (where the nitrogen concentration $[N]_f$ is 35 mass ppm or lower) was reached, but at a concentration higher than that, the achieved nitrogen concentration $[N]_f$ did not decrease and remained high. The result of the study as just described led to the development of the second embodiment, i.e., a molten steel denitrification method in which, in addition to the above-described first embodiment, further the MgO concentration (MgO) in the slag is limited to 5 mass % or lower. It is preferable that a molten steel temperature after the denitrification process is used as the molten steel temperature $T_f$, and that the denitrification process is completed at 1600° C. or higher, although it depends on a casting step that is a later step and a transfer time. While the lower limit of the MgO concentration (MgO) in the slag is not particularly limited, it may be 0 mass %.

Third Embodiment

Figure 5:
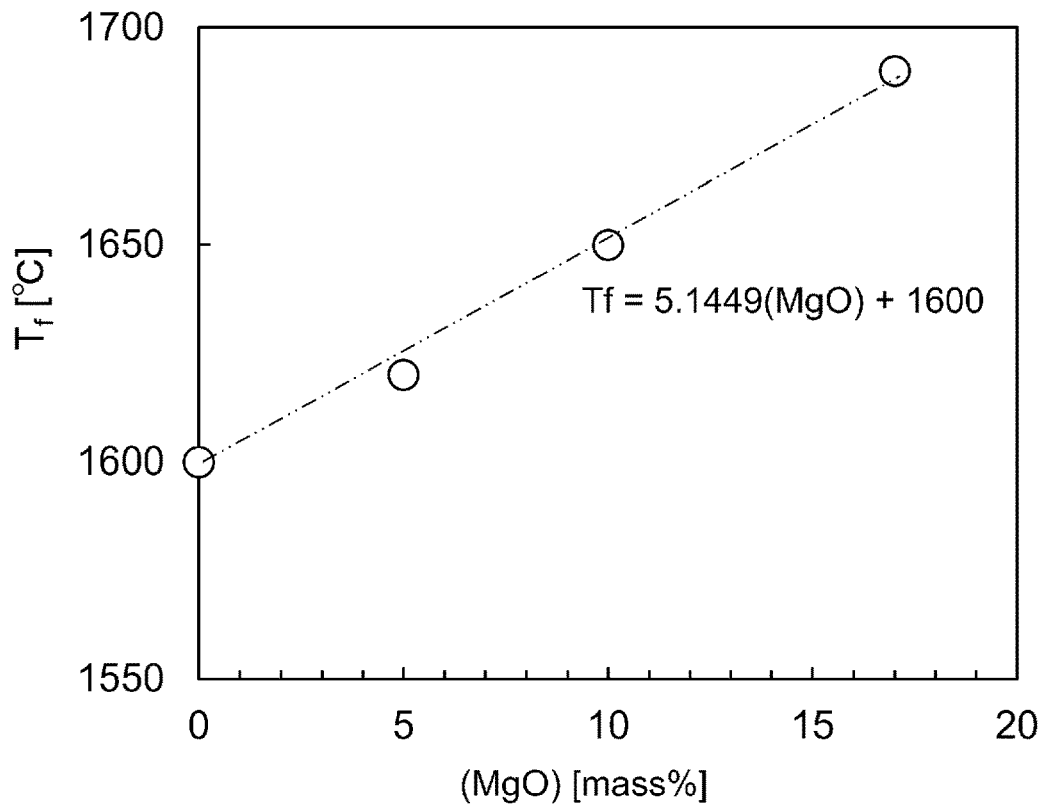
FIG. 5 is a graph showing molten steel temperatures $T_f$ for obtaining the same achieved nitrogen concentration [N]$_f$ when the MgO concentration (MgO) in slag is changed.

A third embodiment was found in the course of exploring improvement measures for a decrease in the denitrification speed in the case where it is unavoidable to increase the MgO concentration from the viewpoint of protecting the refractory of the vessel into which the molten steel is charged. Using the aforementioned small-sized high-frequency vacuum induction melting furnace, a study was conducted on the molten steel temperature $T_f$ that was required to reduce the nitrogen $[N]_f$ in the molten steel to 25 mass ppm when the MgO concentration (MgO) in the CaO—and—$Al_2O_3$-containing slag was changed from 0 mass % to a saturated concentration. As a result, as shown in FIG. 5, at each time when the MgO concentration (MgO) in the slag was increased by 1.0 mass %, the molten steel temperature $T_f$ needed to be raised by about 5° C. As preconditions for the study, the furnace atmospheric pressure P was $4\times10^3$ Pa; the Al concentration [Al] was 0.7 mass %; the initial nitrogen concentration $[N]_i$ was 50 mass ppm; the C/A in the slag composition was 1.2; the stirring power density ε was 60 W/t; and the processing time t was 30 minutes. This study has quantitatively revealed the amount of increase in the molten steel temperature that can compensate for a decrease in the denitrification reaction due to an increase in the MgO concentration. The result of the study as just described led to the development of the third embodiment, i.e., a molten steel denitrification method in which, in addition to the first embodiment, the temperature of the molten steel is increased by 5° C. or more at each time when the MgO concentration (MgO) in the slag increases by 1.0 mass % beyond 5.0 mass %.

Fourth Embodiment

Figure 6:
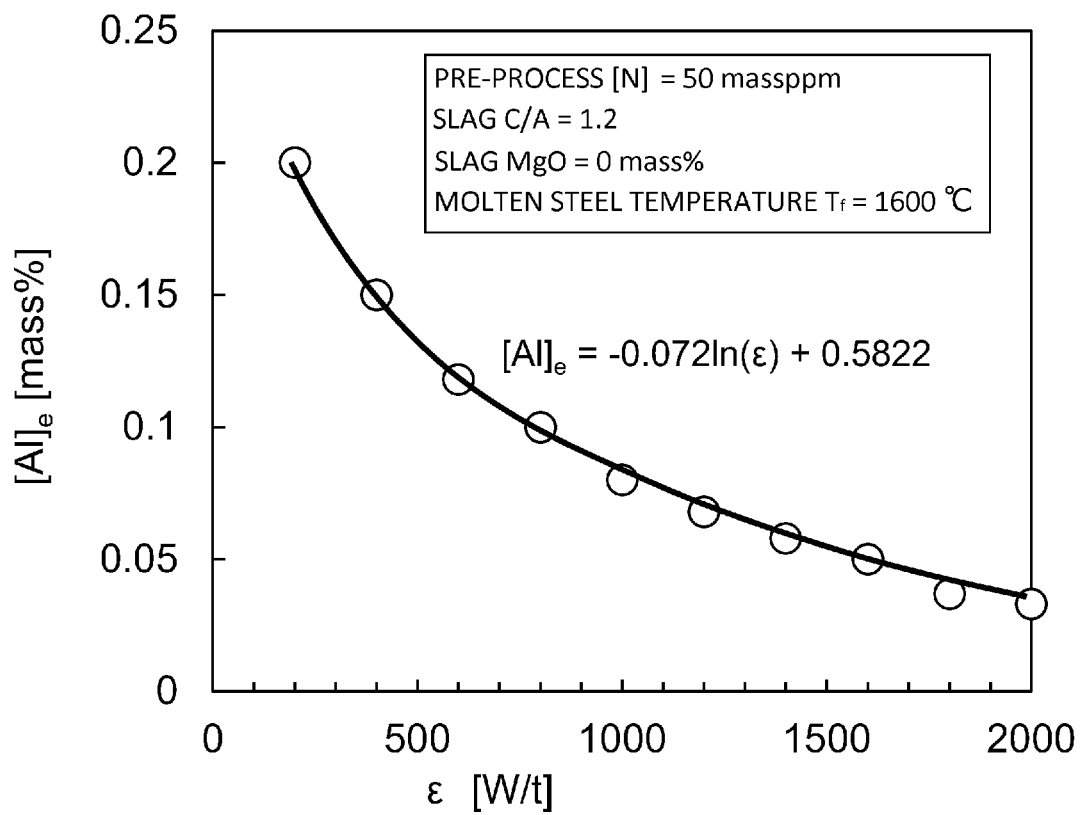
FIG. 6 is a graph showing a relationship between an Al concentration [Al]$_e$ in molten steel and the stirring power density $\varepsilon$ for obtaining an achieved nitrogen concentration [N]$_f$ of 25 mass ppm.

Patent Literature 3 requires an Al concentration [Al] in molten steel of 0.3 mass % to 2 mass % as a concentration needed to increase the ratio of nitrogen distribution between slag and metal, which makes it costly to produce ordinary steel. A fourth embodiment was found in the course of exploring the possibilities of removing nitrogen with the Al concentration [Al] in the molten steel reduced to a lower concentration to solve this problem. As a result of studying the minimum required Al concentration $[Al]_e$ for reducing nitrogen in molten steel to 25 mass ppm using the aforementioned small-sized high-frequency vacuum induction melting furnace, it was found that, as shown in FIG. 6, the required Al concentration $[Al]_e$ (mass %) varied according to the stirring power density ε (W/t). Here, the MgO concentration (MgO) in the slag was 0 mass % and the molten steel temperature $T_f$ was 1600° C., and the initial nitrogen concentration $[N]_i$ and the C/A in the slag composition were the same as those mentioned above. As preconditions for the study, the furnace atmospheric pressure P was $0.7\times10^5$ Pa; the stirring power density ε was controlled so as to remain constant within a range of 200 to 2000 W/t during the process; and the processing time t was 30 minutes. The result of the study as just described led to the development of the third embodiment, i.e., a molten steel denitrification method in which, in addition to any one of the first to third embodiments, in the Al addition step, the Al concentration [Al] (mass %) in the molten steel is set to be equal to or higher than a value $[Al]_e$ calculated by the following Formula (A) based on the stirring power density ε (W/t) during the denitrification process.

$$[Al]_e = -0.072 \times \ln(\varepsilon) + 0.5822 \tag{A}$$

(Steel Production Method)

It is preferable that molten steel produced by the above-described molten steel denitrification method is cast after additionally it is adjusted to a predetermined composition and form control and floating separation of inclusions are performed as necessary. It is possible to produce high-grade steel which is low-nitrogen steel and of which various components have been adjusted.

EXAMPLES

In the following, examples of the present invention will be described in detail. Using the device having the configuration of FIG. 1, metal Al was added to molten steel at 1600° C. or higher inside a ladle to set the Al concentration in the molten steel to 0.085 to 0.1 mass %. CaO and refractory-protecting MgO were added to form CaO—$Al_2O_3$ binary slag or CaO—$Al_2O_3$—MgO ternary slag. Then, a bottom-blown stirring gas was supplied at a stirring power density ε of 60 to 1000 W/t. The test was conducted using an amount of molten steel of 160 t. The mass ratio C/A between CaO and $Al_2O_3$ in the slag composition was within a range of 0.4 to 1.8.

Table 1 shows the test conditions and the results. In processes No. 1 to 4 in which the stirring power density ε is sufficient, the results were favorable with the post-process N concentration $[N]_f$ at 35 mass ppm or lower. By contrast, in process No. 5 in which the stirring power density ε is low, nitrogen was not sufficiently removed in the same processing time t.

TABLE 1

| | Slag | Molten Steel | | | | | | | |
|---|---|---|---|---|---|---|---|---|---|
| No. | (MgO) mass % | [Al] mass % | $T_f$ ° C. | ε W/t | P $10^5$ Pa | $[N]i$ massppm | $[N]f$ massppm | t min | Remarks |
| 1 | 10 | 0.1 | 1600 | 60 | 0.67 | 50 | 35 | 30 | Invention Example |
| 2 | 5 | 0.1 | 1600 | 60 | 0.67 | 50 | 30 | 30 | Invention Example |
| 3 | 10 | 0.1 | 1625 | 200 | 0.67 | 50 | 25 | 30 | Invention Example |
| 4 | 10 | 0.085 | 1625 | 1000 | 0.67 | 50 | 13 | 30 | Invention Example |
| 5 | 10 | 0.1 | 1600 | 30 | 1.0 | 50 | 49 | 30 | Comparative Example |

INDUSTRIAL APPLICABILITY

When applied to a steel production process of producing molten steel by melting low-carbon scrap or reduced iron in an electric furnace etc., the molten steel denitrification method according to the present invention can stably mass-produce low-nitrogen steel. Thus, this method contributes to reducing $CO_2$ and is industrially useful.

REFERENCE SIGNS LIST

1 Vessel
2 Refractory
3 Molten steel
4 CaO—and—$Al_2O_3$-containing slag
5 Bottom-blowing nozzle
6 Gas pipe
7 Stirring inert gas
8 Exhaust system
9 Alloy addition system
10 Vacuum vessel

The invention claimed is:

1. A molten steel denitrification method that is a denitrification process in which CaO—and—$Al_2O_3$-containing slag formed by a combination of an Al addition step of adding a metal—Al-containing substance to molten steel to deoxidize and turn the molten steel into Al-containing molten steel and a CaO addition step of adding a CaO-containing substance to the Al-containing molten steel to remove nitrogen in the molten steel without use of a top-blown gas, wherein
the molten steel is stirred at a stirring power density ε of 60 W/t or higher,
a temperature of the molten steel, an Al concentration in the molten steel, an atmospheric pressure in a furnace and a slag composition are adjusted, and either condition (A) or (B) is selected so as to achieve a N concentration $[N]_f$ at 35 mass ppm or lower:

(A) wherein in the denitrification process, an MgO concentration in the slag is set to 5.0 mass % or lower, except for 0, and (B) wherein in the denitrification process, a temperature $T_f$ of the molten steel undergoing the denitrification process is increased by 5° C. or more each time the MgO concentration in the slag increases by 1.0 mass % beyond 5.0 mass %, compared to a molten steel temperature during said denitrification process required to reduce the N concentration $[N]_f$ in the molten steel to a predetermined value when the MgO concentration is 5.0 mass % in the slag.

2. The molten steel denitrification method according to claim 1, wherein, in the denitrification process, a surface of the molten steel or the slag is subjected to an atmosphere of $1.0 \times 10^5$ Pa or lower.

3. The molten steel denitrification method according to claim 2, wherein, in the Al addition step, an Al concentration [Al], in mass %, in the molten steel before the denitrification process is set to be equal to or higher than a value $[Al]_e$ calculated by Formula (A) based on the stirring power density ε, in W/t, during the denitrification process, $$[Al]_e = -0.072 \times \ln(\varepsilon) + 0.5822 \quad \text{(A)}.$$

4. The molten steel denitrification method according to claim 1, wherein, in the Al addition step, an Al concentration [Al], in mass %, in the molten steel before the denitrification process is set to be equal to or higher than a value $[Al]_e$ calculated by Formula (A) based on the stirring power density ε, in W/t, during the denitrification process, $$[Al]_e = -0.072 \times \ln(\varepsilon) + 0.5822 \quad \text{(A)}.$$

5. A steel production method wherein molten steel produced by the molten steel denitrification method according to claim 1 is cast after a composition of the molten steel is adjusted.

* * * * *